United States Patent [19]
Chiang

[11] Patent Number: 5,497,819
[45] Date of Patent: *Mar. 12, 1996

[54] MODULAR CAR COVER

[76] Inventor: Hsi-Ming Chiang, 930 St. Andrews Dr., Malvern, Pa. 19355

[ * ] Notice: The term of this patent shall not extend beyond the expiration date of Pat. No. 5,435,362.

[21] Appl. No.: 413,615

[22] Filed: Mar. 30, 1995

Related U.S. Application Data

[63] Continuation-in-part of Ser. No. 136,886, Oct. 18, 1993, Pat. No. 5,435,362.

[51] Int. Cl.⁶ ..................................................... B60J 11/00
[52] U.S. Cl. .......................... 150/166; 296/95.1; 296/136
[58] Field of Search .................................. 150/166–168; 296/136; 206/335

[56] References Cited

U.S. PATENT DOCUMENTS

| | | | |
|---|---|---|---|
| 2,243,981 | 6/1941 | Rowan | 296/136 X |
| 2,787,311 | 4/1957 | Cohen et al. | 150/166 |
| 2,801,667 | 8/1957 | Curran | 296/136 X |
| 4,154,254 | 5/1979 | Spencer | 296/136 |
| 4,209,197 | 6/1980 | Fischer | 296/136 X |
| 4,294,483 | 10/1981 | Ferris | 296/136 |
| 4,355,839 | 10/1982 | Rosen | 296/136 |
| 4,859,459 | 5/1986 | Lantrip | 296/136 X |
| 4,948,191 | 8/1990 | Cao | 296/136 X |
| 4,952,007 | 8/1990 | Shahrokh | 296/136 X |
| 4,972,892 | 11/1990 | Yeh | 150/166 |
| 4,973,100 | 11/1990 | Yang | 296/136 |
| 5,115,848 | 5/1992 | Malone | 150/166 |
| 5,161,849 | 11/1992 | Holland, Jr. | 296/136 X |
| 5,244,246 | 9/1993 | Cunningham | 296/136 |

FOREIGN PATENT DOCUMENTS

| | | | |
|---|---|---|---|
| 1200574 | 2/1986 | Canada | 296/136 |
| 1238286 | 7/1960 | France | 296/136 |
| 785039 | 10/1957 | United Kingdom | 296/136 |

*Primary Examiner*—Sue A. Weaver
*Attorney, Agent, or Firm*—Richard C. Litman

[57] ABSTRACT

A modular car cover has a cab covering portion and a shirt. A skirt is attachable to the cab portion to extend the latter to become a full car cover. The skirt may be formed as one part, or may comprise forward and rear parts. The skirt is gathered at the bottom by an elastic band or, in other embodiments, by a drawstring which has a hook and ring for tightness adjustment. In another embodiment, the drawstring terminates in chains, which are padlocked together for security. The cab covering portion is provided as a single panel, cruciform piece, with four sections draping over the windshield, two sides, and rear window. In alternative embodiments, the cruciform piece is abbreviated, and separate depending panels are attached thereto. These depending panels overlie one another, so that the cab covering portion better conforms to the vehicle, and adjusts to cover the corners of the cab, which are somewhat exposed by the cruciform embodiment. The cab covering portion connects to the skirt by hook and loop fastener, and has individual pouches for covering the exterior mirrors of an automobile. The multi-part car cover is more easily stored and installed, and offers the option of protecting the cab from solar heating by employing only the cab covering portion, as well as protecting the entire vehicle by employing the skirt also.

15 Claims, 7 Drawing Sheets

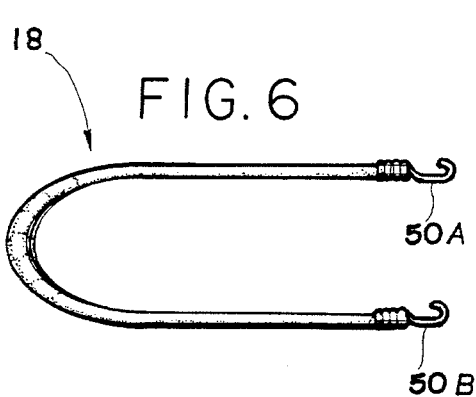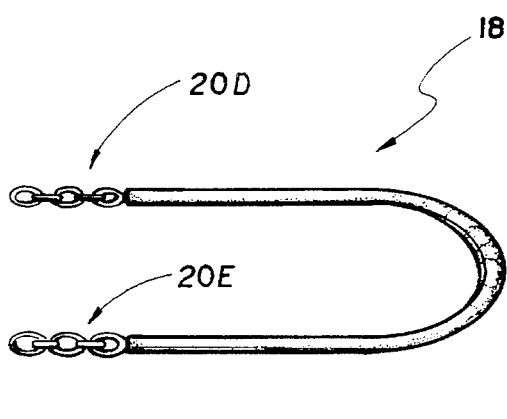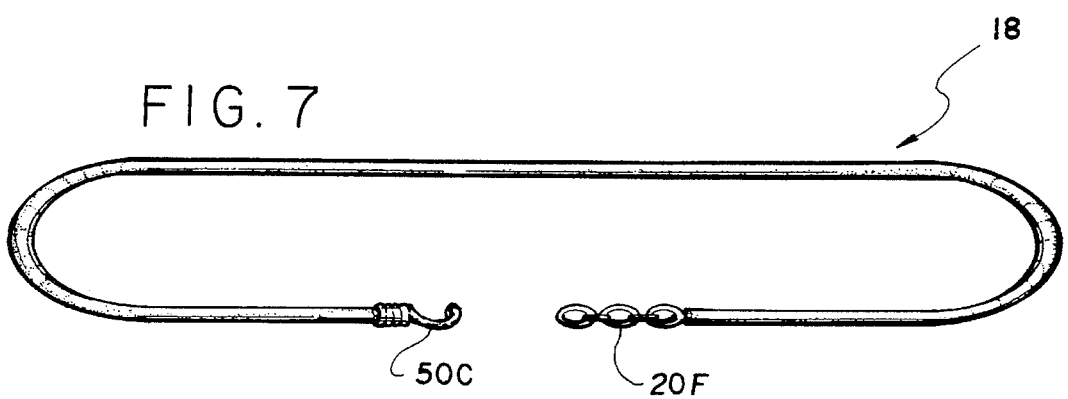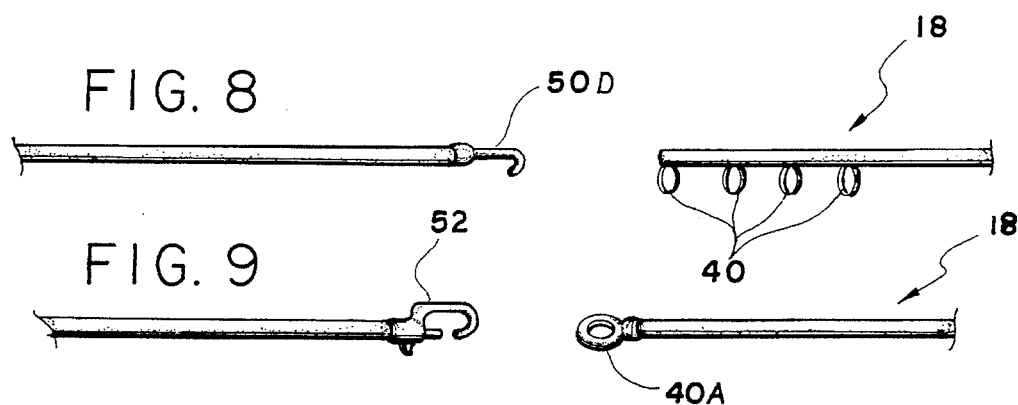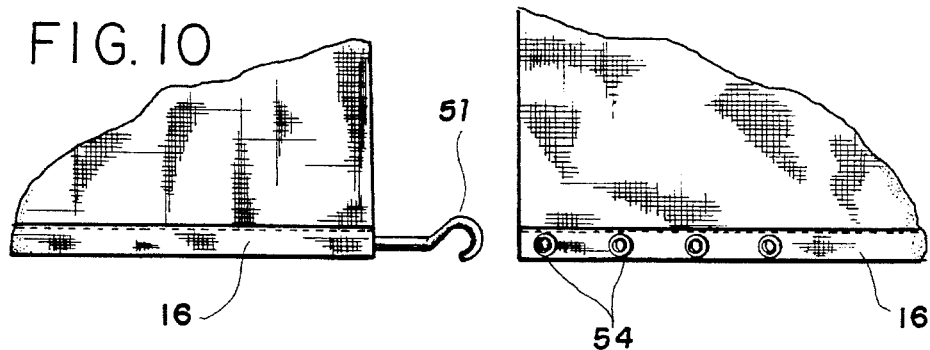

MODULAR CAR COVER

REFERENCE TO RELATED APPLICATION

This application is a continuation-in-part of Ser. No. 08/136,886, filed Oct. 18, 1993, U.S. Pat. No. 5,435,362.

BACKGROUND OF THE INVENTION

1. Field of the Invention

The present invention relates to flexible car covers, and more particularly to a modular cover having attaching sections. One module covers the cab portion of a vehicle, and the other module covers the body portion of the vehicle. The cover has theft resistant anchoring members secured by closing a vehicle door or window thereover.

2. Description of the Prior Art

Motor vehicles, and particularly privately owned automobiles, are susceptible to being rendered uncomfortable and to being damaged by periodic exposure to the sun and weather. One especially vexing problem for the typical owner of a car is that when parked temporarily in the sun, the passenger compartment quickly becomes quite hot. This is very uncomfortable to passengers upon returning to the vehicle. It is also potentially damaging to the car and its contents. Plastic and leather fabrics and coverings are more rapidly aged or dried by exposure to heat or to ultraviolet light which enters the cab. Certain personal property commonly carried in cars, such as magnetic audio tapes, are also quite susceptible to damage from heat.

Other environmental hazards which are desirable to avoid include dust, dirt, rain, snow, and frost, which may accumulate on exterior vehicle surfaces, and ice formation on vehicle windows.

Motor vehicle covers have been developed to protect vehicles from these conditions. Some are full body covers, that is, which envelope or cover an entire vehicle body. Others are designed specifically to cover only the window area, since both heat and window fouling hazards impinge principally to the cab area of motor vehicles. A cover which covers the windows only, or which covers roof and windows, will be termed a cab cover. A full body cover can be awkward and unwieldy to install, unattractive, and may occupy a large amount of space when stored.

Both types of covers, full body and cab, if sufficiently small, light, and flexible as to conform to vehicle body contours and to be easily installed and removed, are susceptible to theft.

Car covers, therefore, must be designed to accommodate conflicting requirements. Many different approaches have been attempted to produce a satisfactory cover.

Modular car covers are set forth in U.S. Pat. Nos. 4,209,197, issued to Moritz Fischer on Jun. 24, 1980, and 5,244,246, issued to Sidney A. Cunningham on Sept. 14, 1993. The Fischer patent discloses a two part cab cover which forms one piece by hook and loop adherence of the two parts, and which fastens to the vehicle by nipple anchors secured to the vehicle which pass through eyes formed in the cover. Cunningham provides selective covering of individual windows.

The above inventions are more limited in their scope than is the present invention, and further lack specific details employed in the latter.

U.S. Pat. No. 4,355,839, issued to Jack S. Rosen on Oct. 26, 1982, illustrates a full body cover which is secured to the vehicle by anchors. The anchors have enlarged members entrapped within the vehicle when a door or window is closed over the tether attaching the enlarged member to the cover. The anchors of the present invention are different from those of Rosen.

Various fasteners for connecting separate parts of a car cover are shown in U.S. Pat. No. 4,952,007, issued to Riaz D. Shahrokh on Aug. 28, 1990, and French Pat. No. 1,238,286, dated Jul. 4, 1960. Although the hooks and eyes shown in these references would serve the purposes of the present invention, their precise application differs in both construction and location when incorporated into the novel car cover described herein.

None of the above inventions and patents, taken either singly or in combination, is seen to describe the instant invention as claimed.

SUMMARY OF THE INVENTION

The present invention provides a theft resistant, modular car cover. The modules include a cover for the cab and a skirt which is attached thereto. The cab cover will be employed most frequently in hot weather when it is desired to protect the cab interior from objectionable heating in the sun.

Optionally, the cover is extended to cover the entire vehicle body save the undercarriage. This is accomplished by attaching the skirt, which may be formed in one piece or two pieces. A one piece skirt is lowered over the cab and attached to the cab cover. A two piece skirt, which is divided into front and rear mating pieces, has the ability to adjust for the length of the vehicle.

The advantages accruing from this arrangement include the possibility of protecting the cab only, with attendant savings in time, effort, and storage space required to install and stow the cover. When it is desired to protect the entire body, as may be desired in the event of rain, snow, sleet, hail, wind, dust, tree sap, animal droppings, airborne pollution, and so forth, the cab cover is still employed, and the skirt is attached thereto.

The skirt, which is provided as one or two pieces in different embodiments, attaches quickly and easily to the cab cover, not having the bulk and weight of a full body cover. Also, a full body cover would require a second cover when it is desired to protect only the cab. Thus, there is a net savings in expense, effort of installation, and storage space, while providing maximal versatility for addressing specific needs.

Additional features of the novel cover include reversibility for different weather conditions, and attachment schemes for gathering the skirt, when employed, tightly about at the bottom of the body. Gathering the skirt renders the same resistant to removal and theft.

In different embodiments, the cab cover is formed with different numbers of overlying panels. In further embodiments, the drawstring for gathering the skirt has different arrangements of hooks and eyes. In one embodiment, a padlock is employed, and the hook is omitted.

Construction of the present invention also lends itself to conforming better to vehicle bodies of different configurations. This occurs because overlying panels can slide over one another when accommodating different body shapes. This accommodation is also more sightly, since a large, single piece cover, unless very carefully configured to cooperate with a particular vehicle body, is invariably bulky and ill-fitting.

One practical aspect of a cover member which does not extend below the cab is that the cover can be secured to the vehicle at the top of the door, or by rolling up a window. An anchor comprising a tether having enlarged heads is entrapped in the door or window. This is not feasible with a full body cover. The top portion and skirt each have tethers.

Tethers passing through holes formed in the central panel are placed between the door and its jamb, or between the window and its casing of the vehicle, and the respective door or window is closed thereover. The anchor comprises an enlarged object too bulky to be pulled through the gap between door and jam, or window and casing, and therefore secures the cover to the vehicle.

This arrangement is very advantageous for several reasons. Firstly, the tether is integral with the cover, in the sense that there are no separate parts which could become lost. Also, there is no requirement for additional locking apparatus.

The tether is also long enough to reach into the windows and doors of most vehicles. This enables ready manipulation when installing the cover on a vehicle, and adapts the cover to vehicles having differing dimensions and configurations.

The anchors enable the doors or windows of a vehicle to retain a cover member in positive fashion. The trunk of the vehicle may, if desired, be employed to entrap the cover.

Therefore, the novel vehicle cover can be secured to the vehicle in the manner of a partial cover, even though it covers the entire vehicle body when the skirt is attached.

It is further desirable to provide a vehicle cover which is reversible, selectively exposing a reflective surface upwardly for heating protection from the sun, and exposing a water impermeable surface to ward off rain, snow, and ice.

The present invention provides a vehicle cover which satisfies these objectives, while improving on the practicality of the prior art.

Accordingly, it is a principal object of the invention to provide a vehicle cover for a vehicle which selectively protects only the cab, and also is extended to protect the entire body.

A second object of the invention is to provide a vehicle cover which is adjustable to fit differently configured vehicle bodies.

It is a further object of the invention to secure the cover to the vehicle by entrapment of cover members by the doors, trunk lid, or windows of the vehicle, and particularly at the top of the doors or windows.

An additional object of the invention is to provide a vehicle cover which is readily folded for storage and installed.

Still another object of the invention is to gather the vehicle cover at the bottom.

Still an additional object of the invention is to render the gathering adjustable, and to secure the same at a desired adjustment.

It is a further object of the invention to provide the cab covering portion of the vehicle cover with overlying panels, so that the cover adjustably conforms to different vehicle bodies.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 6 is an exploded perspective detail view of one embodiment of a drawstring suitable for gathering the skirt depicted in FIG. 3.

FIG. 7 is a perspective detail view of another embodiment of a drawstring suitable for the skirt depicted in FIG. 1.

FIGS. 8, 9, and 10 are exploded, perspective detail views of alternative embodiments of closure components for the drawstring according to the present invention.

Similar reference characters denote corresponding features consistently throughout the attached drawings.

DETAILED DESCRIPTION OF THE PREFERRED EMBODIMENTS

Figure 1:
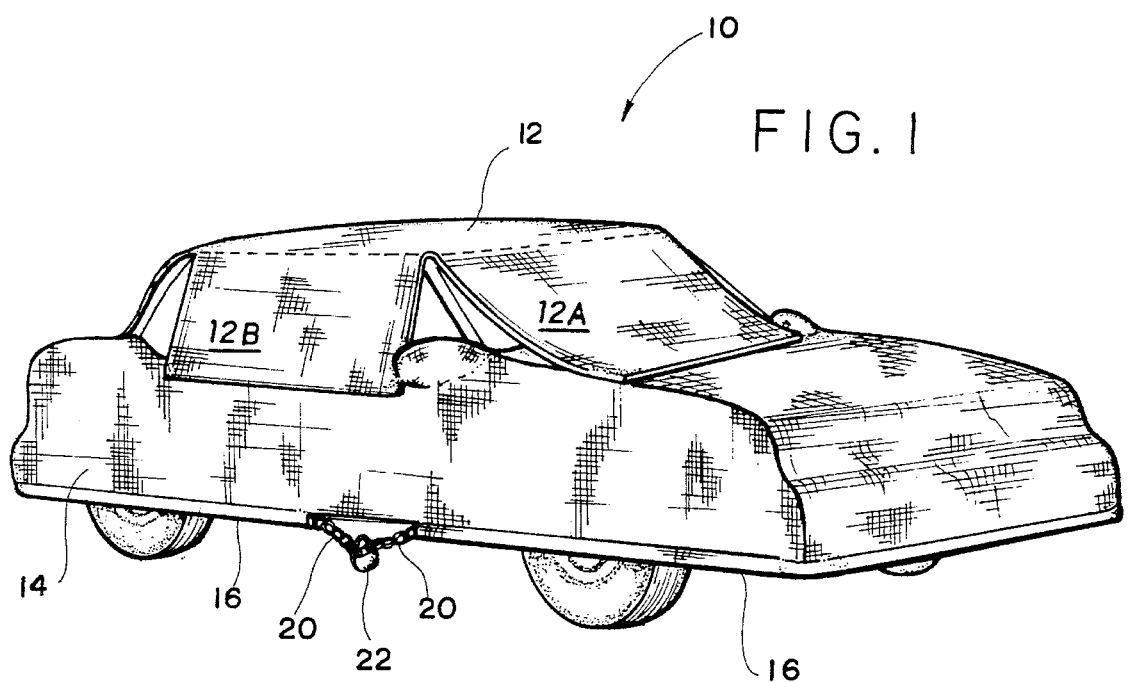
FIG. 1 is an environmental, perspective view of a first embodiment of the vehicle cover according to the present invention.

Turning now to FIG. 1 of the drawings, the present vehicle cover 10 is seen to comprise two principal components, a cab covering member 12 and a skirt 14. The cab covering member 12 covers the roof and exterior windows of a vehicle cab. Member 12 is essentially cruciform, there being a central section 12A covering the roof and extending so as to cover the windshield and rear window of the vehicle, and side sections 12B for covering vertical surfaces of the vehicle cab.

Figure 2:
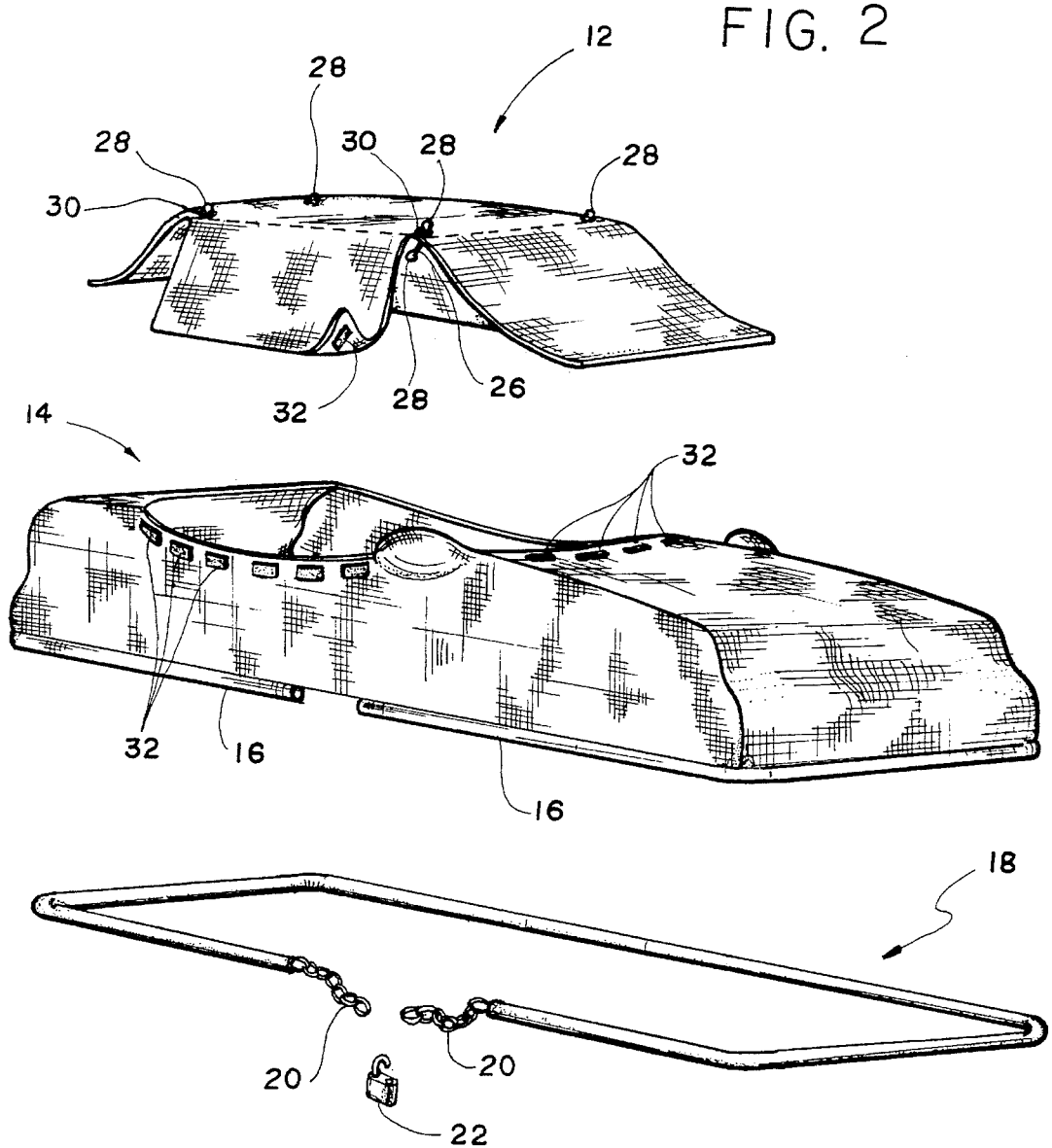
FIG. 2 is an exploded, perspective view of the embodiment of FIG. 1.

Covering of the entire lower vehicle body is accomplished by attaching member 12 to skirt 14. As best shown in FIG. 2, skirt 14 has a central opening 31 through which the vehicle cab projects. A hem 16 depends from the lower periphery of skirt 14. The hem 16 encloses and retains a drawstring (not shown in FIG. 1) for gathering skirt 14 tightly about the bottom of the vehicle body. As best shown in FIG. 2, drawstring 18 terminates at both ends with a chain 20 having interlocking links. A padlock 22 is installed over links at both ends of chain 20 to maintain drawstring 18 tight.

Many varieties of closures for securing drawstring 18 in place are possible. These varieties share the common characteristic that there is at least one end having a loop for receiving an engaging projection. In the embodiment described above, padlock 22 provides the engaging projection.

FIG. 2 shows additional details of vehicle cover 10. Anchoring for securing cab covering member 12 to the vehicle are seen to comprise a tether 26 terminating in enlarged heads 28. Tether 26 is permanently entrapped in reinforced holes or eyes 30 formed in the central panel of cab covering member. One enlarged head 28 is placed within the vehicle, and entrapped by closing the vehicle window or door thereover. It is preferred that four anchoring means be provided, so that the center panel of cab covering member 12 be securely fastened to the vehicle.

Attachment of cab covering member 12 to skirt 14 is performed by providing both with alignable, cooperating components 32 of hook and loop fastening material. This maintains both member 12 and skirt 14 in their respective positions, properly covering the vehicle body. As depicted in FIG. 2, cooperating fastening components 32 are located on the exterior of skirt 14 and the interior of member 12. In this instance, skirt 14 is set in place on the vehicle first, and member 12 is placed thereonto. Of course, it would be feasible to reverse this order, so that member 12 is placed on the vehicle first, and skirt 14 place thereover.

It will be appreciated that hook and loop attachment of skirt 14 to member 12 is insufficient to deter casual theft. Improved security is provided by gathering skirt 14 so that it cannot be pulled upwardly and away from the vehicle. Drawstring 18 is provided to gather hem 16 of skirt 14. A portion of drawstring 18 may be made of an elastic or resilient material to maintain a taut drawstring when its ends are joined together.

Figure 3:
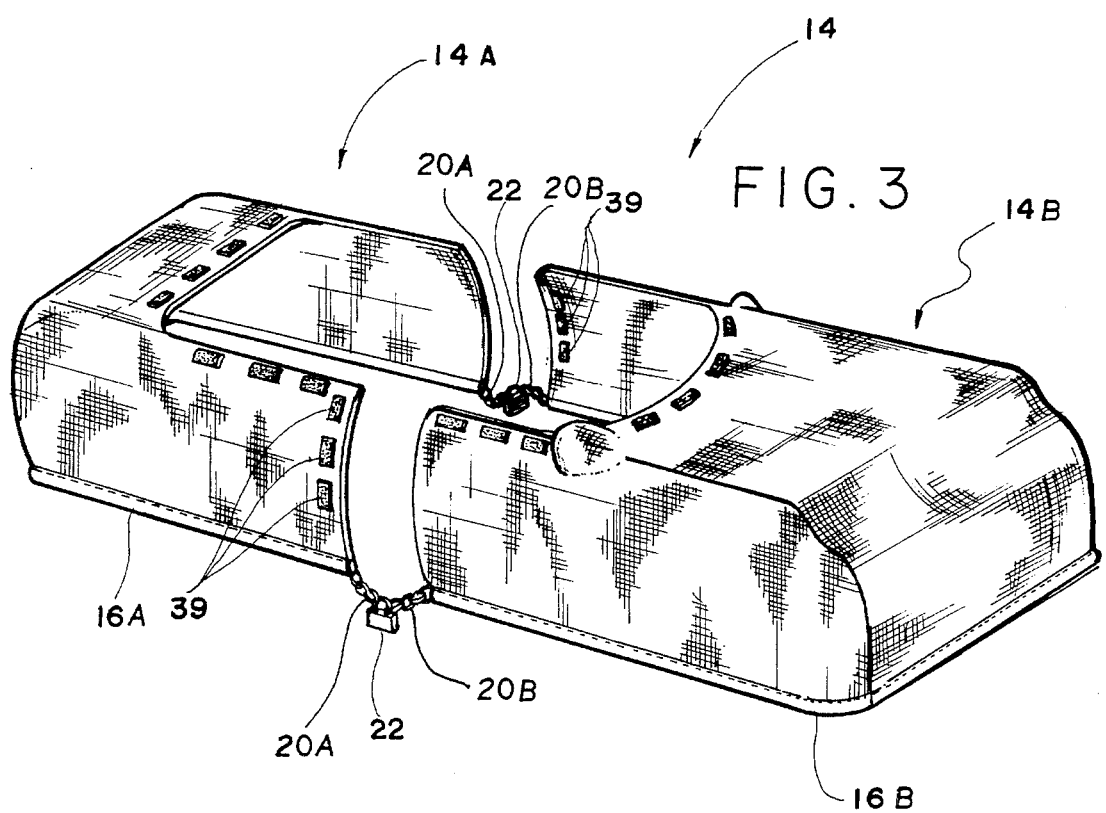
FIG. 3 is an exploded, perspective view of a second embodiment of the skirt of the present invention.

A second embodiment of skirt 14 is illustrated in FIG. 3. In this embodiment, skirt 14 comprises front and rear sections 14A,14B. Sections 14A and 14B are joined by alignable, cooperating components 39 of hook and loop fastening material to provide a vertical seam. Sections 14A and 14B include hem sections 16A and 16B containing drawstring sections (not shown) which terminate into chain links 20A and 20B. The drawstring sections are gathered and joined together in the manner described hereinabove. Thus, two padlocks 22 are required to unite the drawstring sections into a continuous band encircling the vehicle body.

Figure 4:
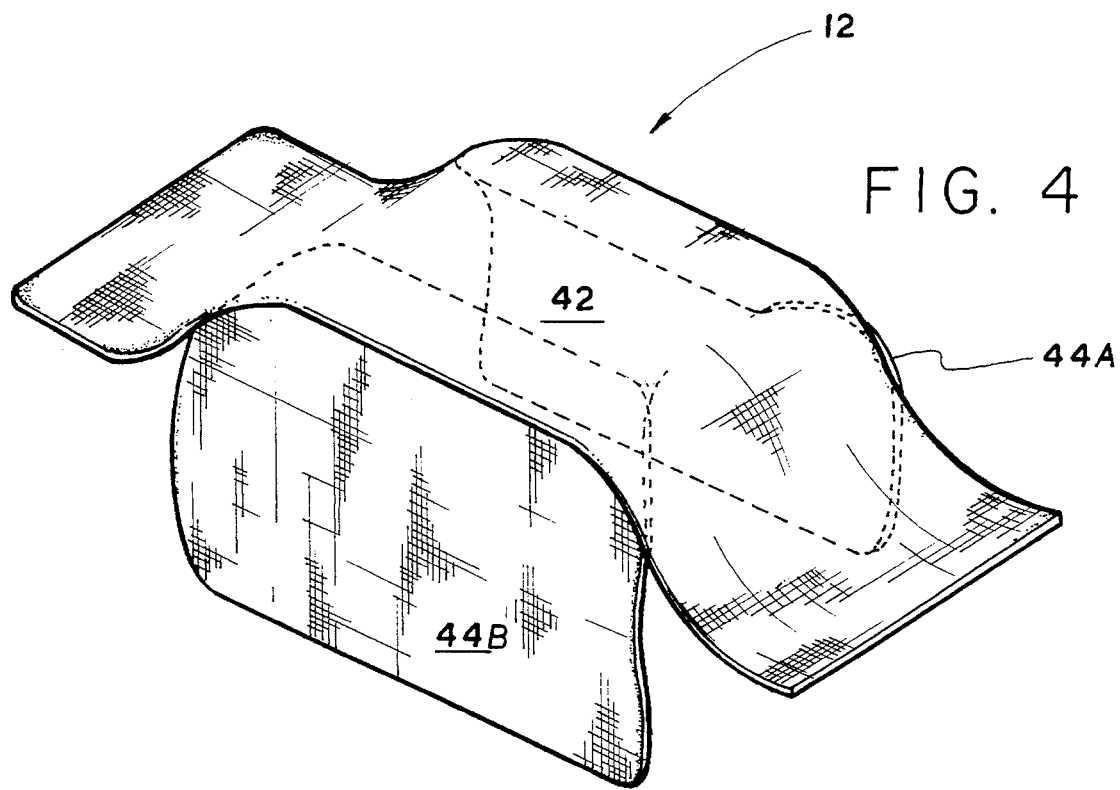
FIG. 4 is a perspective view of a second embodiment of the cab covering portion of the present invention.
Figure 5:
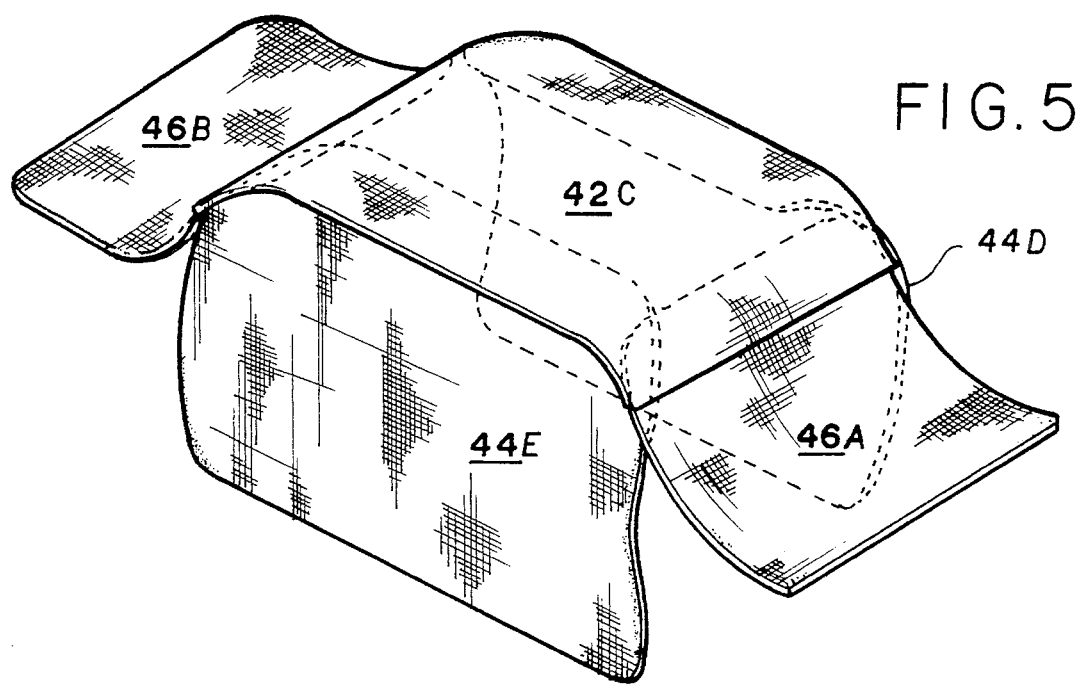
FIG. 5 is a perspective view of a third embodiment of the cab covering portion of the present invention.

Other embodiments of cab covering member 12 are shown in FIGS. 4 and 5. In order to have member 12 better conform to the exterior contours of the vehicle, it is advantageous to form member 12 from three sections of fabric. In FIG. 4, it will be seen that central panel 42 partially overlies right and left panels 44A and 44B. In this manner, member 12 avoids exposing corners of the vehicle cab, which condition is illustrated in FIG. 1.

In FIG. 5, two additional sections of fabric are added to the embodiment of FIG. 4. Central panel 42C partially overlies front and rear panels 46A and 46B, as well as left and right panels 44D and 44E.

The additional layers of material in partial overlying relationship further cover or seal the corners of the vehicle cab, while enabling the cab covering member to better conform to the vehicle contours.

Several different arrangements of drawstring 18 are possible, as shown in FIGS. 6–10. In FIG. 6, drawstring 18 is formed in two parts, as would be required for the embodiment of skirt 14 depicted in FIG. 3. One part has chain sections 20D and 20E at each terminus, and the other part has hooks 50A and 50B to engage links of chain sections 20D and 20E, respectively. The selection of links enables adjustment of tension of drawstring 18.

FIG. 7 illustrates the same type of engagement wherein drawstring 18 is of one piece construction and includes a hook 50C at one end and a chain section 20F at the other end, as would be required for the embodiment of skirt 14 depicted in FIG. 2.

FIG. 8 illustrates another embodiment wherein the chain of FIG. 7 is replaced by a plurality of individual loops 40 secured to drawstring 18 at one end for engagement with hook 50D at the other end thereof. Wider spacing of loops is enabled with the same number thereof, when compared to the proximity of links within a chain.

In FIG. 9, a self-closing hook 52 is shown. This type of hook will better secure attachment to single loop 40A where tension is somewhat lax, or where wind or like conditions threaten to disengage a hook from its loop.

FIG. 10 shows still another arrangement for joining end sections of hem 16 together. In this embodiment, loops are provided by reinforced eyelets 54 formed in one end of hem 16. A hook 51 is secured at the other end of hem 16 for engagement with one of eyelets 54.

Figure 11:
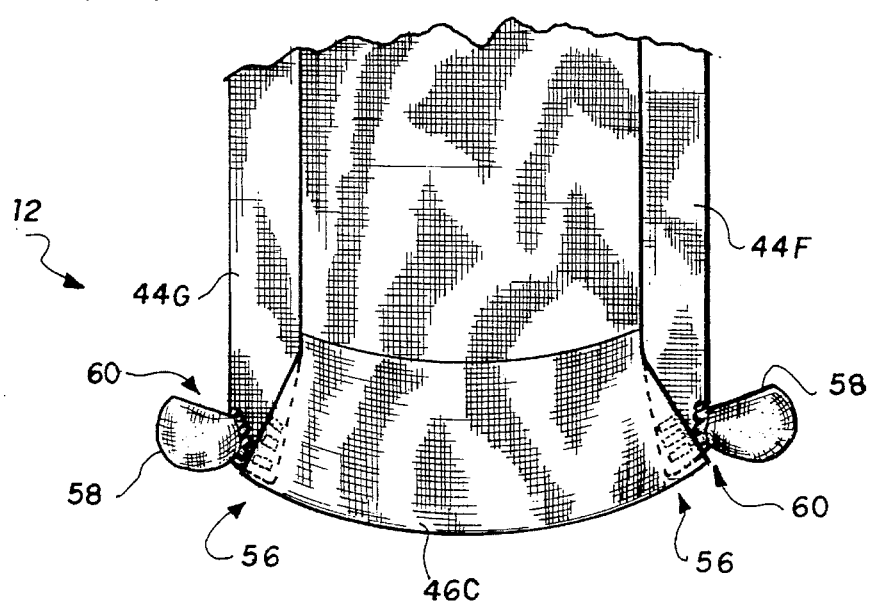
FIG. 11 is a detail view of an alternative construction of the cab covering portion of the present invention.

FIG. 11 shows an alternative arrangement of the embodiment shown in FIG. 5, wherein front and rear panels 46A and 46B overlie left and right panels 44D and 44E. As depicted in FIG. 11 with specific reference to the front panel, it can be seen that front panel 46C is cut to be wider at the bottom than at the top, so that a degree of overlap is present. Mating hook and loop patches 56 are provided on the outer surface of panels 44F and 44G and the underside of panels 46C so that the entire vehicle cab is covered.

The designation of a particular one of panels 44F and 44G and 46C as lying above the other is not critical. Either front panels 46C or left and right panels 44F and 44G may lie above the other at their respective overlapping ends proximate hook and loop patches 56.

Another feature shown in this Figure is provision of pouches 58 for covering exterior mirrors. Each pouch is gathered by an integral elastic band, generally indicated at 60, where pouch 58 meets its associated panel 44.

Figure 12:
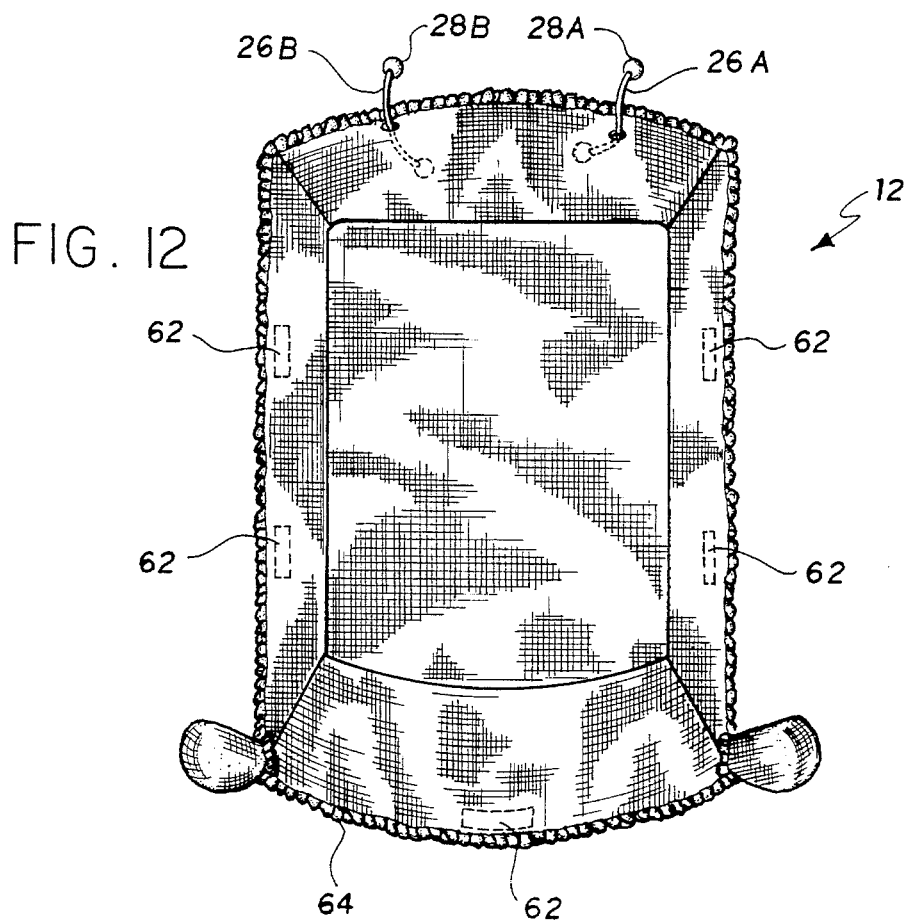
FIG. 12 is a top plan view of the embodiment of FIG. 11.

FIG. 12 shows a preferred arrangement of tethers 26A and 26B at the rear of cab covering portion 12. From this location, tethers 26A and 26B can be entrapped within the trunk of the vehicle. Magnets 62 sewn into the fabric are located low on cab covering portion 12 to adhere to a ferrous metal vehicle body. Depending upon the body design of the vehicle, cab covering portion 12 may include an elastic hem 64, as shown in FIG. 12, or may omit this hem, as shown in FIG. 11.

It should be noted that cab covering portion 12 may be formed from a single piece of material die cut or otherwise fabricated, or alternatively, from a plurality of separate pieces subsequently joined together. Regardless of the method of fabrication, cab covering portion comprises the individual panels described herein, there being a central panel, right and left side panels, a front panel for covering the windshield, and a rear panel for covering the rear window.

Figure 13:
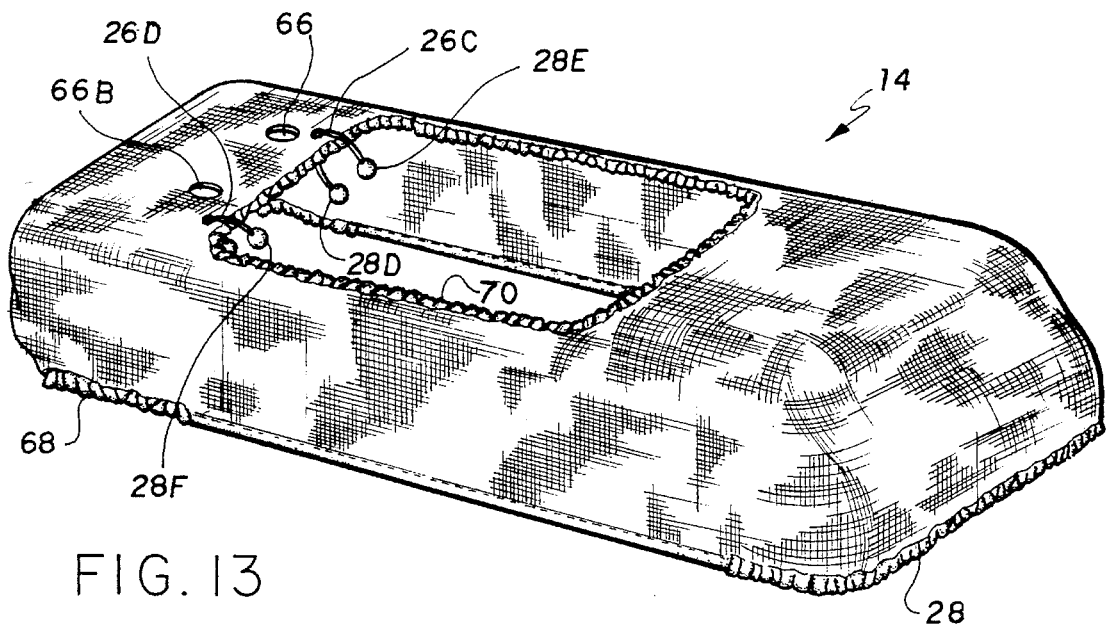
FIG. 13 is a perspective view of an alternative embodiment of the skirt of the present invention.

Turning now to FIG. 13, skirt 14 is modified to cooperate with the embodiment of cab covering portion 12 shown in FIGS. 11 and 12. Two holes 66A and 66B are provided in skirt 14 to enable passage of enlarged heads 28A and 28B connected to the tethers 26A and 26B shown in FIG. 12 to penetrate through skirt 14 in order to extend to the trunk of the vehicle. Skirt 14 is provided with enlarged heads 28C, 28E and 28D, 28F connected to tethers 26C and 26D, respectively which also extend to the trunk. Thus, both cab covering portion 12 and skirt 14 are secured to the vehicle independently of one another.

Skirt 14 is provided with a partial elastic hem 68 at front and rear, and optionally at 70.

Figure 14:
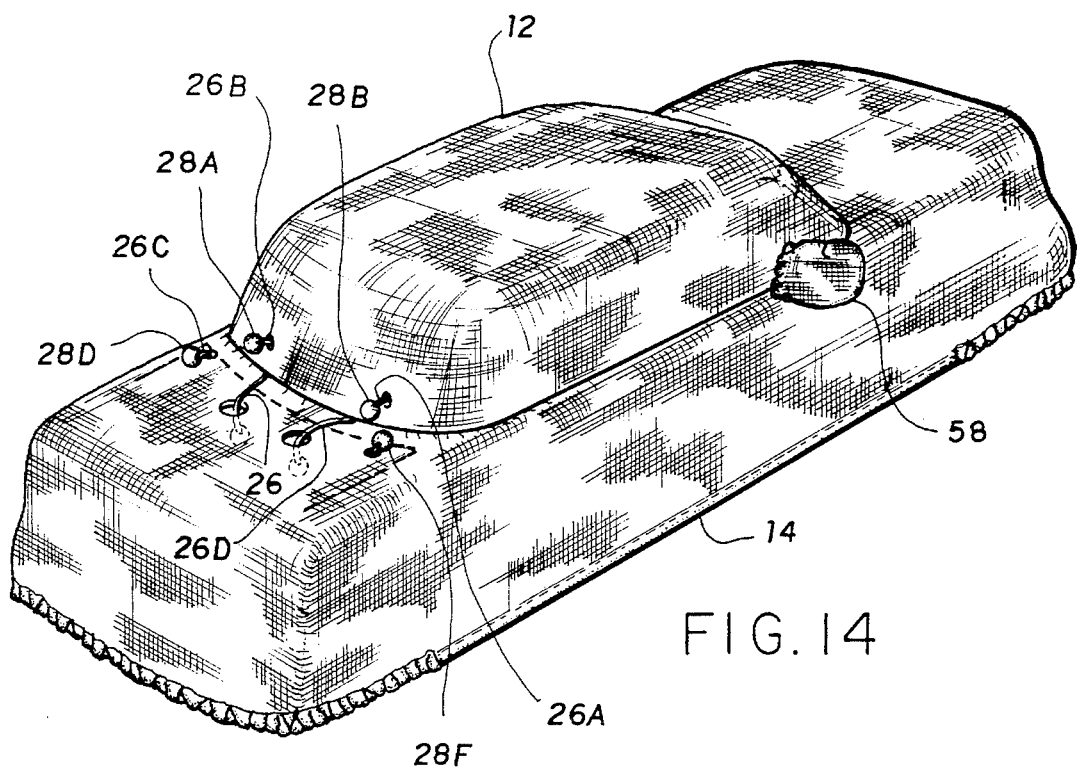
FIG. 14 is a perspective view of the components of FIG. 11 and 13 as they would appear when draped over an automobile.

The components of FIGS. 11, 12, and 13 are shown in FIG. 14 as they would appear installed on an automobile body. Although not shown taut, tethers 26A, 26B and 26C and 26D secure both the cab covering portion 12 and skirt 14 to the trunk. The vehicle mirrors are covered by pouches 58.

A preferred material for fabricating cover 10 is preferably a flexible synthetic resin, having reflective characteristics, or of very light color. This layer would be selected as the upwardly exposed layer when it is desired to protect the passenger compartment from sunlight and heat.

The second layer is preferably metallic, such as aluminum foil. This imparts strength and improves resistance of the first layer to light, moisture, and other contaminants.

A third layer is made from a thermally insulating material.

The last layer is made from a dark or heat absorbing material, preferably also a flexible synthetic resin.

The resultant cover is compact, light, and effectively secured to its associated vehicle.

It is to be understood that the present invention is not limited to the embodiments described above, but encompasses any and all embodiments within the scope of the following claims.

I claim:

1. A modular vehicle cover comprising:

a cab covering member having a central panel for covering the roof and front and rear windows of a vehicle cab, said central panel including two side panels for covering vertical surfaces of the vehicle cab, said two side panels attached to and depending from said central panel, said central panel having four holes spaced apart, each of said holes having a permanently attached tether passing therethrough, each said permanently attached tether having two ends, each of said ends having an anchor attached thereto; and a skirt attachable to said cab covering member for extending said vehicle cover, said skirt having means for manual attachment to said cab covering member.

2. The modular vehicle cover according to claim 1, said skirt includes a hem containing a drawstring having a first end and a second end, said drawstring having means for fastening said first end and said second end together.

3. The modular vehicle cover according to claim 2, said drawstring comprises an elastic band for gathering said hem inwardly at the bottom of the vehicle body.

4. The modular vehicle cover according to claim 2, said hem extending around said skirt, and having a first end and a second end meeting said first end, said first end having a hook attached thereto, and said second end having means defining a plurality of eyelets therein, said hook selectively engageable with said eyelets.

5. The modular vehicle cover according to claim 1, said cab covering member including at least one pouch for covering an exterior mirror of the vehicle, said pouch including an elastic hem for gathering said pouch about the exterior mirror.

6. The modular vehicle cover according to claim 1, said two side panels and said central panel having overlapping ends, there being corresponding patches of hook and loop material disposed upon said overlapping ends for securing said side panels and said central panel in overlying relationship.

7. The modular vehicle cover according to claim 1, said anchor comprising a first enlarged head, and a second enlarged head, whereby said cab covering member is secured to a vehicle when one of said first enlarged head and said second enlarged head of said anchor is placed inside the vehicle by closing selectively one of a door, a trunk lid, and a window over said tether.

8. The modular vehicle cover according to claim 1, said skirt includes two spaced apart holes, each of said holes having a permanently attached tether passing therethrough, each said permanently attached tether having two ends, each of said ends having an anchor attached thereto.

9. The modular vehicle cover according to claim 1, said skirt formed in two sections including a front section and a rear section, said front section including a component of a hook and loop fastener and said rear section including a cooperating component of said hook and loop fastener, whereby said front section is joined to said rear section.

10. The modular vehicle cover according to claim 9, one of said front section and said rear section of said skirt having a hem containing a drawstring disposed therein, said drawstring having a first end comprising a first loop for receiving an engaging projection and a second end comprising a second loop for receiving a second engaging projection, and the other of said front section and said rear section of said skirt having two engaging projections attached thereto, one said engaging projection attachable to said first loop and the other said engaging projection attachable to said second loop.

11. A modular vehicle cover comprising:

a cab covering member having a central panel for covering the roof and front and rear windows of a vehicle cab, and two side panels for covering vertical surfaces of the vehicle cab, said side panels being attached to and depending from said central panel;

said central panel having holes spaced apart therein, each of said holes having a permanently attached tether passing therethrough, each said permanently attached tether having a first end terminating in a first enlarged head, and a second end terminating in a second enlarged head, whereby said cab covering member is secured to a vehicle when one of said first enlarged head and said second enlarged head is placed inside the vehicle by closing selectively one of a door, a trunk lid, and a window over said tether; and a skirt attachable to said cab covering member for extending said vehicle cover, said skirt having means for manual attachment to said cab covering member and a hem having an elastic band disposed at the bottom of said skirt for gathering said hem about the body of the vehicle.

12. The modular vehicle cover according to claim 11, said skirt having at least one hole therein, said at least one hole having a permanently attached tether passing therethrough, said permanently attached tether having a first end terminating in a third enlarged head, and a second end terminating in a fourth enlarged head, whereby both said cab covering portion and said skirt are each secured to the vehicle independently of one another.

13. The modular vehicle cover according to claim 11, said two side panels and said central panel of said cab covering member having overlapping ends, there being corresponding patches of hook and loop material disposed upon said overlapping ends for securing said side panels and said central panel in overlying relationship.

14. A modular vehicle cover comprising:

a cab covering member having a central panel for covering a roof portion and front and rear windows of a vehicle cab and two side panels for covering vertical surfaces of the vehicle cab, said side panels being attached to and depending from said central panel, said central panel having four holes spaced apart, each of the four holes having a permanently attached tether passing therethrough, each said permanently attached tether having two ends, each of said ends having an anchor attached thereto; and a skirt attachable to said cab covering member for extending said vehicle cover, said skirt formed in two sections including a front section and a rear section, said front section including first patches of hook and loop fastener and said rear section including second patches of hook and loop fastener cooperating with said first patches of hook and loop fastener, whereby said front section is joined to said rear section, and said skirt having means for manual attachment to said cab covering member and a hem comprising an elastic band, said hem disposed at the bottom of said skirt, for gathering said hem inwardly at the bottom of the vehicle body, said skirt further having means defining a hole therein, and an anchor, said anchor comprising a tether, said hole having a permanently attached tether passing therethrough, said tether having a first end terminating in a first enlarged head, and a second end terminating in a second enlarged head, whereby said modular vehicle cover is secured to a vehicle when one of said first enlarged head and said second enlarged head of said anchor is placed inside the vehicle by closing selectively one of a door and a window over said tether.

15. The modular vehicle cover according to claim 14, said cab covering member further comprising at least one pouch for covering an exterior mirror of the vehicle, said pouch including an elastic hem for gathering said pouch about the exterior mirror.

\* \* \* \* \*